United States Patent [19]

Souleillan et al.

[11] Patent Number: 4,831,994

[45] Date of Patent: May 23, 1989

[54] EXPANDED LIQUIFIED GAS MIXER FOR FEEDING OF HEAT ENGINES

[76] Inventors: Bernard Souleillan; Louis Olivan, both of rue Rameau, 65300 Lannemezan, France

[21] Appl. No.: 113,671

[22] Filed: Oct. 28, 1987

[30] Foreign Application Priority Data

Oct. 30, 1987 [FR] France ............................... 86 15119

[51] Int. Cl.[4] ............................................. F02B 43/00
[52] U.S. Cl. ................................. 123/527; 48/184
[58] Field of Search ........................... 123/527; 48/184

[56] References Cited

U.S. PATENT DOCUMENTS

| | | | |
|---|---|---|---|
| 2,203,961 | 6/1940 | Jones | 48/184 |
| 3,282,664 | 11/1966 | Baverstock | 48/184 |
| 3,741,737 | 6/1973 | Jones | 123/527 |
| 4,020,810 | 5/1977 | Baverstock | 123/527 |
| 4,553,519 | 11/1985 | Masson | 123/527 |
| 4,594,900 | 6/1986 | Batchelor | 123/527 |

*Primary Examiner*—E. Rollins Cross
*Attorney, Agent, or Firm*—Browdy & Neimark

[57] ABSTRACT

An expanded liquified gas mixer to feeding heat engines. The mixer comprises a body whose upper part comprises a cavity divided into two chambers by an elastic membrane. The membrane exhibits in its center an orifice on the edge of which is fastened the upper edge of a register piston which extends downwardly in a blind hole and which slides around a gas intake tube, an air intake duct, and an engine feed duct. An elongated hole is made in the gas intake tube, parallel to its axis, at the level of the ducts.

10 Claims, 1 Drawing Sheet

U.S. Patent
May 23, 1989
4,831,994
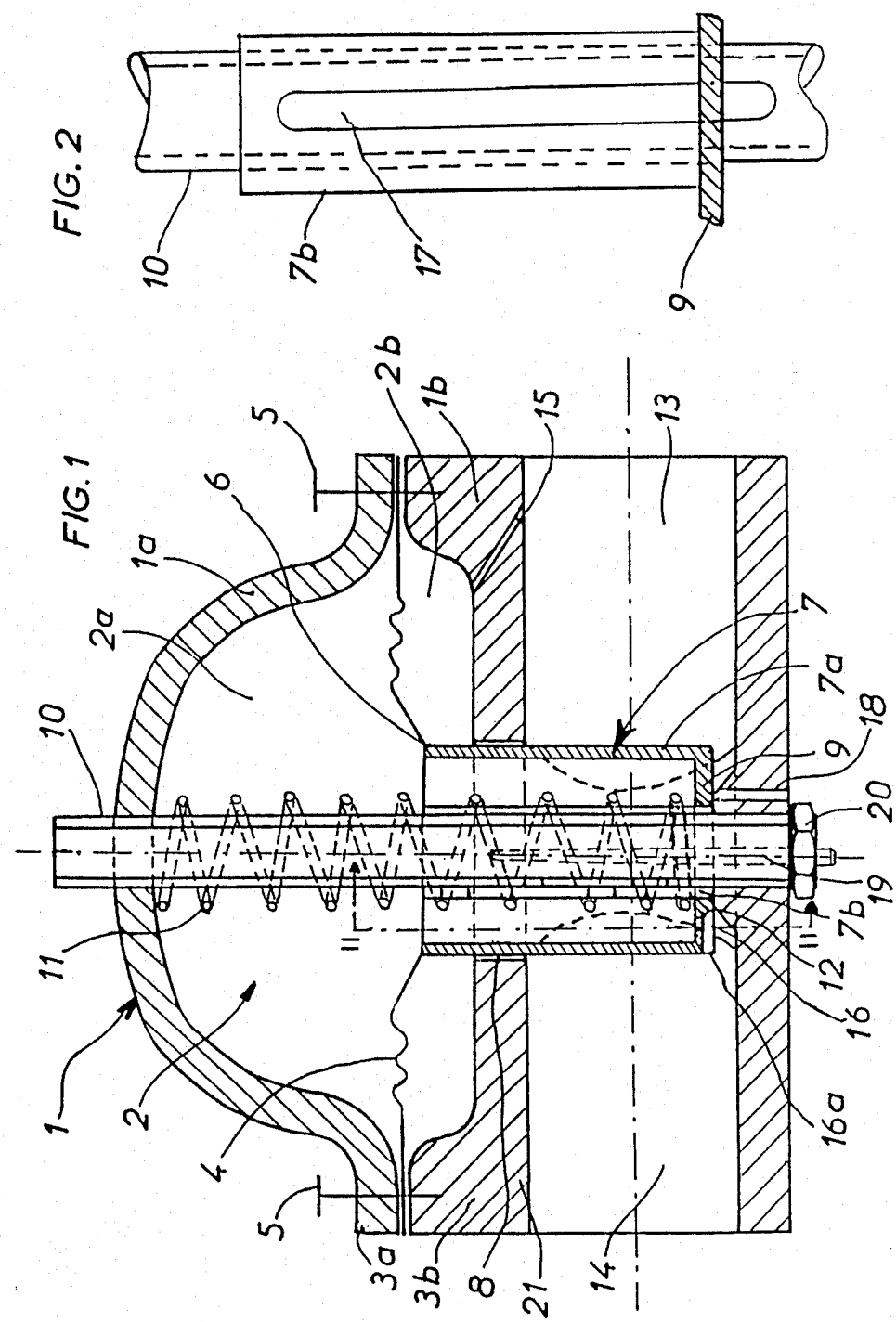

4,831,994

EXPANDED LIQUIFIED GAS MIXER FOR FEEDING OF HEAT ENGINES

FIELD OF THE INVENTION

This invention relates to a mixer for liquified gas which has been expanded to bring liquified gas to the gas phase at a pressure close to atmospheric pressure and which, in all that follows, will be called "expanded liquified gas." In heat engines, and in particular, in internal combustion engines such as in motor vehicles, such a gas is injected into air coming from an air filter to produce an air/gas mixture which feeds the engine, the injection taking place in a mixer which is supposed to give the mixture an adequate gas content.

BACKGROUND OF THE INVENTION

Such mixers are already known, and the one described in U.S. Pat. No. 2,203,961 comprises a body whose upper part comprises a cavity divided into two chambers by an elastic membrane having in its center an orifice on whose edge is fastened the upper edge of a vertical register cylinder which slides in a blind hole and which controls the delivery of air and gas which feed the engine. The lower and upper faces of the elastic membrane specified above are respectively in communication by passages with the air intake duct and engine feed duct.

It is understood that the pressure difference existing between the air intake and the mixer outlet is reflected by the same pressure difference on both sides of the membrane and by a deformation of this latter which fixes the height of the register cylinder. This modifies the delivery of injected gas which thus can be made dependent upon the air delivery and the operating conditions of the engine.

However, such mixers exhibit numerous drawbacks which are due particularly to the fact that the gas content of the air/gas mixture introduced into the engine is not adapted to certain operating conditions, such as idling or starting cold, which is reflected, in particular, by changes in consumption with time.

Further, a considerable pressure loss occurs between the air intake and the engine feed, which is reflected, in particular, by a considerable response time.

SUMMARY OF THE INVENTION

The object of the invention is to provide a mixer of the type specified above in which the injection of the gas into the intake manifold is independent of phenomena external to the engine, such as excess pressures at the intake or increases of the vacuum due to clogging of the air filter.

Another object is to propose a device which is particularly suited to bicarburation, i.e., to engines operating with both gas and gasoline or fuel oil.

An additional object is the design of a mixer which is simple, inexpensive and easy to install and which avoids the need for providing further adjustments.

These objects and others which will come out below are attained by a mixer of the type specified above which is characterized by the fact that its air intake duct and its engine feed duct, horizontal and aligned with one another, come out in the above specified blind hole on both sides of it, and its register cylinder is a register piston formed by two coaxial cylinders connected by an annular bottom, the outside cylinder sliding in the above blind hole, and the inside hole sliding with gentle friction on an expanded liquified gas coaxial intake tube whose wall exhibits a single longitudinal hole located in the zone of the engine feed duct.

Relative to known mixers, the first of these arrangements reduces the pressure losses and, consequently, the response times, while the second makes it possible totally to disengage the air intake manifold when the register piston is in high position, so that the system according to the invention, contrary to all others, easily solves the problem of bicarburation, i.e., that of instantaneous passage from carburation with expanded liquified gas to carburation with gasoline or fuel oil, and vice versa.

The preceding further shows that the mixer of the invention comprises a minimum number of elements which, moreover, are as simple as they are inexpensive, and its adjustment is invariably fixed when it is put in place.

Advantageously, a compensating spring penetrates into a space between the two cylinders of the register piston according to the invention and rests, downward, on the bottom of the latter, and, upward, on the wall of the upper chamber of the cavity specified above.

This spring acts as a reinforcement of gravity to shove the register piston toward the bottom of the blind hole in which it slides, and, consequently, toward its position where the air intake is closed.

Preferably, a needle of predetermined profile, fastened by its head to the bottom of the mixer body, extends axially upward in the expanded liquefied gas intake tube to a level close to the height of the hole made in this tube.

This needle, whose position can be dependent upon an adjustment sensor, makes the gas content of the mixture feeding the engine suitable at all speeds. Actually, its profile makes it possible to control passage sections available for the gas a each level of the longitudinal hole uncovered by the rising of the register piston, and to adjust the richness of the mixture for each type of engine.

In an advantageous embodiment, the passage which puts the upper face of the elastic membrane of the mixer according to the invention in communication with the feed duct of the engine consists of two holes made in the bottom of the register piston, and preferably the lower part of this bottom exhibits a shallow recess which extends between each hole and the outside wall of the bottom parallel to the axis of the air intake and engine feed ducts, which facilitates starting of the process.

Preferably, the body of the mixer according to the invention, at the level of its cavity, is made in two parts which are assembled by flanges between which is held the edge of the elastic membrane specified above, which facilitates assembly of this membrane.

Further, a wall of the mixer body can comprise a passage for a rod intended to shove upward or to lock in high position, from the outside, the bottom of the register piston according to the invention, to put it out of service without pressure losses when gas feeding is abandoned. This rod can be locked in the high position by a solenoid valve, while the intake of gas is cut off and the intake of the other fuel is opened by means of additional solenoid valves.

Finally, the body of this mixer can also comprise a passage which connects the air intake and engine feed ducts together and which can be more or less closed by a needle screw screwed from the outside, to provide an added amount of air to adjust the carbon monoxide content of the exhaust gases during idling of the engine.

BRIEF DESCRIPTION OF THE DRAWINGS

The following description, which does not exhibit any limiting character, will give a better understanding of how this invention can be embodied. It should be read with reference to the accompanying drawings, of which:

FIG. 1 represents a longitudinal section of the mixer according to the invention, and FIG. 2 shows a partial elevation view of the object of FIG. 1 taken along line II—II of this figure.

In all that follows, and to simplify the description, it will be assumed that the expanded liquified gas mixer according to the invention is in the position on the figures, which gives all their meaning to expression such as "horizontal," "lower," "right," etc. However, it is understood that this apparatus could operate in another position.

As can be seen in FIG. 1, this mixer comprises a body which is designated as a whole by the reference 1 and which is divided horizontally into a dome-shaped upper part 1a and a lower part 1b of greater height, between which is formed a cavity 2. Edges 3a and 3b of parts 1a and 1b, respectively, exhibit the shape of flanges and enclose between them the edge of an elastic membrane 4 due to locking elements which are represented very diagrammatically as 5. This membrane 4 separates cavity 2 into two chambers 2a and 2b an it comprises a central hole on edge 6 of which is fastened by any suitable means the upper edge of a register piston 7 which extends downward through a vertical blind hole 8 made in lower part 1b of body 1.

Register piston 7 is actually a double cylinder: it comprises an outside cylinder 7a which slides with gentle friction in a blind hole 8 and which is connected by a bottom 9 to an inside cylinder 7b sliding around a vertical expanded liquified gas intake tube 10 which is connected to a standard pressure reducing valve. A compensating spring 11 surrounds tube 10 and disposed inside cylinder 7b of register piston 7. It rests downward on bottom 9 of the latter and upward on the wall of high part 1a of body 1. In its low position, register piston 7 rests on a base 12 made in the bottom of blind hole 8.

The lower part 1b of body 1 is pierced to the opening in hole 8 by two ducts in alignment: the one, 13, at the right of the figure, serving for air intake, and the other, 14, on the left of the figure, carrying the air/gas mixture to the engine that is to be fed. These ducts are easily connected by simple hose connections to the air filter for the first, and to the gasoline or fuel oil carburation for the second.

It now being a matter of the circulation of the various fluids used, a balancing passage 15 connects air intake duct 13 to lower chamber 2b of cavity 2, therefore below membrane 4, and a vacuum connector connects duct 14 going to the engine to the space made between cylinders 7a and 7b of register piston 7 and, therefore, to higher chamber 2a of cavity 2, above membrane 4. The vacuum connection can consist of two holes 16 made in bottom 9 of register piston 7, the lower part of this bottom 9 exhibiting a shallow recess 16a which extends between each hole 16 and the outside wall of bottom 9, parallel to the axis of air intake duct 13 and engine feed duct 14.

Finally, as can be seen better in FIG. 2, gas intake tube 10 exhibits a calibrated hole 17 elongated in the direction of its generatrices which extends to the level of duct 14 going to the engine by being directed to the latter, therefore on the left in FIG. 1.

On the other hand, a needle 19 extends in the axis of gas intake tube 10; it is fastened to the bottom of lower part 1b of body 1 by an outside bolt 20 screwed to a threaded part which terminates it downward and which goes through the bottom of part 1b, and it exhibits a cylindrical portion which extends upward by a conical part to terminate at the level of the upper plate 21 of lower part 1b of body 1.

The mode of operation of this device is the following: when the engine is stopped, register piston 7 is in its low position represented in FIG. 1, resting on base 12, under the effect of gravity and of compensating spring 11. During starting, the vacuum which is created in engine feed duct 14 is transmitted into chamber 2b by connector 16, and it lifts membrane 4 with register piston 7 over a height corresponding to the difference between the pressure prevailing in engine feed duct 14 which is transmitted by vacuum connector 16, and the pressure in air intake duct 13 which is transmitted by balancing passage 15 and which is close to atmospheric pressure. Thus, the base of register piston 7 more or less disengages the passage between ducts 13 and 14, as a function of the difference between the pressures prevailing there. Simultaneously, the upward movement of register piston 7 more or less uncovers hole 17 of gas intake tube 10, below the bottom of this register piston 7, which disengages a passage with a more or less large section, allowing the gas to flow with a greater or lesser delivery rate to engine feed duct 14.

Thus, the passage section passed through the gas coming from intake tube 10 and therefore the delivery of gas can be adjusted in a predetermined way as a function of the pressure difference between ducts 14 and 13 by suitably selecting the elasticity of membrane 4 and compensating spring 11, which is done by simple preliminary tests which are within the scope of one skilled in the art and which will not be described here.

Finally, calibrated needle 19, because of its conical shape at the level of the passage of gas of tube 10 into hole 17, makes it possible to refine the adjustment of the gas delivery. Its position is normally fixed at assembly, but it is possible to make it dependent upon a barometric aneroid or another adjustment sensor. Its dimensions are determined as a function of each type of engine and also by means of prior tests.

It is thus possible to act on the proportion of gas admitted at the various engine speeds, and particularly at idle and no- load running, while avoiding the fouling phenomena which could appear during cold starting.

It will also be noted that the wall of lower part 1b of body 1 of the mixer according to the invention can comprise a passage 18 which is intended to be passed through with gentle friction by a rod (not shown) making it possible to shove the register piston completely upward. This arrangement puts the latter out of service when feeding with expanded liquefied gas is abandoned for feeding with gasoline or fuel oil.

The movement of the rod in question can be controlled mechanically by a sheathed cable which ends at a pull knob mounted on the dashboard, or also automatically, either by an electromagnet driving the rod when gas feeding is being put out of service, or by a membrane which receives the pressure from the gasoline or fuel oil pump during passage to such a type of carburation.

In any case, a solenoid valve puts the gas feeding circuit out of service during passage to operation with gasoline or fuel oil and another solenoid valve opens the intake of this liquid fuel.

On the other hand, lower part 1b of body 1 of the mixer can comprise a bypass passage (not shown) which connects air intake duct 13 and engine feed duct 14 together and into which can penetrate a needle screw, for example horizontal, screwed into body 1 outside the mixer.

This bypass makes it possible to provide an added amount of air to adjust the carbon monoxide content of the exhaust gases during idling of the engine.

The foregoing description of the specific embodiments will so fully reveal the general nature of the invention that others can, by applying current knowledge, readily modify and/or adapt for various applications such specific embodiments without departing from the generic concept and therefore such adaptations and modifications are intended to be comprehended within the meaning and range of equivalents of the disclosed embodiments. It is to be understood that the phraseology or terminology employed herein is for the purpose of description and not of limitation.

What is claimed is:

1. A mixer for liquified gas comprising:
   a body having an upper part and a lower part;
   said upper part comprising a cavity having a first chamber and a second chamber;
   an elastic membrane between said first chamber and said second chamber;
   said membrane having an upper face, a lower face, and a center, and an orifice in the center of said membrane;
   a vertical register piston fastened on said orifice;
   a blind hole in which said vertical register piston slides;
   whereby the delivery of air and gas feeding the engine is controlled by said vertical register piston;
   said upper face of said membrane in contact with a feed duct of an engine;
   said lower face of said membrane in contact with an air intake duct of an engine;
   said ducts are horizontal and aligned with each other;
   said ducts exit onto said blind hole on either side of said blind hole;
   a register cylinder is a register piston formed by an inner cylinder and an outer cylinder which are coaxial with each other and connected by an annular bottom;
   said outside cylinder slides in said blind hole;
   said inner cylinder slides with gentle friction on a coaxial intake tube of liquified gas expanded in the gas phase;
   said intake tube having a single longitudinal hole located in the zone of the feed duct of said engine.

2. The mixer according to claim 1 wherein a compensating spring penetrates into a space between said inner cylinder and said outer cylinder and rests downward on the bottom of said register piston and upward on an wall of the upper chamber of said cavity.

3. The mixer according to claim 1 wherein a needle of a predetermined profile having a head and a body is fastened by its head to the bottom of said mixer body, said needle extending axially upward in the expanded liquified gas intake tube close to the height of a hole made in said coaxial intake tube.

4. The mixer according to claim 3 wherein the position of said needle is axially adjustable.

5. The mixer according to claim 1 wherein a passage puts the upper face of said elastic membrane in communication with said engine feed duct, said passage consisting of two holes made in the bottom of said register piston.

6. The mixer according to claim 5 wherein the lower part of said bottom has a shallow recess therein, said shallow recess extending between said passage and the outside wall of the bottom parallel to the axis of the air intake duct and the engine feed duct.

7. The mixer according to claim 1 wherein the body of said mixer at the level of said cavity is made in a first part and a second part, said first part and said second part assembled by flanges; said elastic membrane held between said flanges.

8. The mixer according to claim 1 wherein one wall of the body of said mixer comprises a passage;
   said passage including a rod adapted and configured to move said register piston by the bottom thereof.

9. The mixer according to claim 1 wherein the body of said mixer comprises a passage which connects the air intake duct and the engine feed duct together, said passage adapted and configured to be closed by a needle screw screwed from the outside of said mixer body.

10. The mixer of claim 8, further comprising means for simultaneously locking said rod in a high position, cutting off the intake of expanded liquified gas and opening the intake of another fuel.

* * * * *